United States Patent
Nam

(10) Patent No.: US 9,386,242 B2
(45) Date of Patent: Jul. 5, 2016

(54) IMAGING DEVICE AND METHOD HAVING A CONTROL CIRCUIT TO SHIFT CHARGES OF THE PHOTODIODE OF EACH PIXEL SIMULTANEOUSLY TO A FIRST STORAGE NODE OR A SECOND STORAGE NODE FOR CAPTURING A MOVING OBJECT WITHOUT DISTORTION AND ACHIEVING A WIDE DYNAMIC RANGE

(71) Applicant: INTELLECTUAL DISCOVERY CO., LTD., Seoul (KR)

(72) Inventor: Jung Hyun Nam, Suwon-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 93 days.

(21) Appl. No.: 14/282,007

(22) Filed: May 20, 2014

(65) Prior Publication Data

US 2014/0339396 A1 Nov. 20, 2014

(30) Foreign Application Priority Data

May 20, 2013 (KR) ........................ 10-2013-0056644
May 20, 2013 (KR) ........................ 10-2013-0056646

(51) Int. Cl.
*H04N 5/372* (2011.01)
*H04N 5/353* (2011.01)
*H04N 5/355* (2011.01)
*H04N 5/359* (2011.01)
*H04N 5/3745* (2011.01)

(52) U.S. Cl.
CPC ........... *H04N 5/3535* (2013.01); *H04N 5/3592* (2013.01); *H04N 5/35581* (2013.01); *H04N 5/3745* (2013.01); *H04N 5/37452* (2013.01)

(58) Field of Classification Search
CPC . H04N 5/374; H04N 5/35581; H04N 5/3535; H01L 27/146
USPC ..... 250/208.1, 214 R, 214 LS; 348/291–311; 257/290–292, 440–444
See application file for complete search history.

(56) References Cited

U.S. PATENT DOCUMENTS 7,286,174 B1 * 10/2007 Weale .................... H04N 5/335
                                                    250/208.1
9,118,883 B2 * 8/2015 Wan ....................... H04N 5/765

* cited by examiner

*Primary Examiner* — Que T Le
(74) *Attorney, Agent, or Firm* — Sughrue Mion, PLLC

(57) ABSTRACT

An imaging device and a method of driving the imaging device including a plurality of pixels and a control circuit to apply a signal to the pixels, wherein the pixels include a photodiode, a floating diffusion node, a first storage node and a second storage node connected in parallel between the photodiode and the floating diffusion node, a first shift switching unit to selectively shift charges integrated in the photodiode to the first storage node, a second shift switching node to selectively shift the charges integrated in the photodiode to the second storage node, a first transfer switching unit to selectively transfer charges integrated in the first storage node to the floating diffusion node, a second transfer switching unit to selectively transfer charges integrated in the second storage node to the floating diffusion node, and a reset switching unit.

22 Claims, 6 Drawing Sheets

IMAGING DEVICE AND METHOD HAVING A CONTROL CIRCUIT TO SHIFT CHARGES OF THE PHOTODIODE OF EACH PIXEL SIMULTANEOUSLY TO A FIRST STORAGE NODE OR A SECOND STORAGE NODE FOR CAPTURING A MOVING OBJECT WITHOUT DISTORTION AND ACHIEVING A WIDE DYNAMIC RANGE

CROSS-REFERENCE TO RELATED APPLICATION

This application claims the priority benefit of Korean Patent Application No. 10-2013-0056644, filed on May 20, 2013, and Korean Patent Application No. 10-2013-0056646, filed on May 20, 2013, in the Korean Intellectual Property Office, the disclosures of which are incorporated herein by reference.

BACKGROUND

1. Field of the Invention

The present invention relates to an imaging device and a method of driving the imaging device, and more particularly, to an imaging device and a method of driving the imaging device that may obtain a characteristic of high sensitivity both at a low luminance and at a high luminance.

2. Description of the Related Art

An image sensor may operate by receiving incident light using a unit pixel, converting the light to an electrical charge, generating a corresponding voltage signal, and outputting the signal. For example, one parameter indicating a performance of a complementary metal oxide semiconductor (CMOS) image sensor is a dynamic range (DR), which is indicated as a ratio of minimum input signals detectable by the CMOS image sensor to maximum input signals that may not saturate the CMOS image sensor.

However, a conventional color image sensor may have a narrow DR and thus, may not express an original color of an image when at least one of red, green, and blue is in a saturated state. To overcome an issue of the narrow DR, a method of implementing a wide dynamic range (WDR) pixel is proposed.

Conventionally, a method of increasing an electrical charge storing capability, or well capacity, of a photoelectric conversion area included in the CMOS image sensor, or a method of reducing dark current or noise such as fixed pattern noise (FPN) may be used to increase the DR of the CMOS image sensor.

Also, an issue of image distortion may occur when a moving object is captured using a rolling shutter that may sequentially shift, by a row or a line, electrical charges integrated in a photoelectric converter, for example, a photodiode, included in a pixel array. Thus, a global shutter method that may simultaneously shift the charges integrated in the photoelectric converter included in the pixel array may be applied to capture a fast moving object.

However, a pixel used to achieve the WDR may not be suitable for the global shutter method to capture the object. Thus, the conventional image sensor may be used by applying separate methods of using the image sensor suitable for the global shutter method based on an environment in which the image sensor is used or using the image sensor suitable to obtain the WDR.

SUMMARY

An aspect of the present invention provides an imaging device and a method of driving the imaging device that may be suitable for achieving a wide dynamic range (WDR) and capturing a moving object without distortion.

According to an aspect of the present invention, there is provided an imaging device including a plurality of pixels and a control circuit to apply a signal to the pixels. The pixels may include a photodiode, a floating diffusion node, a first storage node and a second storage node to be connected in parallel to each other between the photodiode and the floating diffusion node, a first shift switching unit to selectively shift charges integrated in the photodiode to the first storage node, a second shift switching unit to selectively shift the charges integrated in the photodiode to the second storage node, a first transfer switching unit to selectively transfer charges integrated in the first storage node to the floating diffusion node, a second transfer switching unit to selectively transfer charges integrated in the second storage node to the floating diffusion node, and a reset switching unit to be disposed at one side of the floating diffusion unit.

The pixels may further include an overflow control unit to be connected to the photodiode.

A first timing at which the charges integrated in the photodiode are shifted to the first storage node and a second timing at which the charges integrated in the photodiode are shifted to the second storage node may differ.

The control circuit may perform a first reading operation to read an amount of the charges integrated in the first storage node through the floating diffusion node and a second reading operation to read an amount of the charges integrated in the second storage node through the floating diffusion node.

The charges shifted to the first storage node from the photodiode may not be transferred to the second storage node, and the charges shifted to the second storage node from the photodiode may not be transferred to the first storage node.

A first integration time used for integration of the charges to be shifted to the first storage node differs from a second integration time used for integration of the charges to be shifted to the second storage node.

The pixels may further include a third storage node to be connected between the photodiode and the floating diffusion node, a third shift switching unit to selectively shift the charges integrated in the photodiode to the third storage node, and a third transfer switching unit to selectively shift the charges integrated in the third storage node to the floating diffusion node. The third storage node may be connected in parallel to the first storage node and the second storage node.

The first timing at which the charges integrated in the photodiode is shifted to the first storage node, the second timing at which the charges integrated in the photodiode is shifted to the second storage node, and a third timing at which the charges integrated in the photodiode is shifted to the third storage node may differ.

The charges shifted to the first storage node from the photodiode may not be transferred to the second storage node and the third storage node. The charges shifted to the second storage node from the photodiode may not be transferred to the first storage node and the third storage node. Similarly, the charges shifted to the third storage node from the photodiode may not be transferred to the first storage node and the second storage node.

The first integration time used for integration of the charges to be shifted to the first storage node, the second integration time used for integration of the charges to be shifted to the second storage node, and a third integration time used for integration of the charges to be shifted to the third storage node may differ.

According to another aspect of the present invention, there is provided an imaging device including a plurality of pixels and a control circuit to apply a signal to the pixels. The pixels may include a photodiode, a floating diffusion node, and a first storage node and a second storage node to be connected in parallel to each other between the photodiode and the floating diffusion node. The control circuit may set a first integration time used to integrate charges to be transferred to the first storage node in the photodiode and a second integration time used to integrate charges to be transferred to the second storage node in the photodiode to differ.

The control circuit may perform a first shifting operation to shift the charges integrated in the photodiode included in the pixels to the first storage node during the first integration time, and perform a second shifting operation to shift the charges integrated in the photodiode included in the pixels to the second storage node during the second integration time.

The control circuit may simultaneously perform the first shifting operation and the second shifting operation on the pixels.

The control circuit may perform the first shifting operation at a first timing and the second shifting operation at a second timing.

The control circuit may control the pixels to allow an operation of integrating the charges to be shifted to the second storage node in the photodiode to be preformed between the first timing and the second timing.

The control circuit may perform a first reading operation to read the charges shifted to the first storage node.

The control circuit may sequentially perform the first reading operation on the pixels.

The control circuit may perform a second reading operation to read the charges shifted to the second storage node.

The control circuit may sequentially perform the second reading operation on the pixels.

The control circuit may perform a reading operation to read an amount of the charges shifted to the first storage node and the second storage node.

An amount of the charges shifted to the first storage node may be used to obtain a first image, and an amount of the charges shifted to the second storage node may be used to obtain a second image.

A final image may be obtained based on the amount of the charges shifted to the first storage node and the amount of the charges shifted to the second storage node.

The control circuit may not integrate the charges in the photodiode during at least a portion of a first period of time during which the reading operation is performed.

The control circuit may reintegrate the charges in the photodiode after the first period of time elapses.

The charges reintegrated in the photodiode after the first period of time elapses may be used to obtain a subsequent image.

According to embodiments of the present invention, the WDR may be achieved and a moving object may be captured without distortion.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
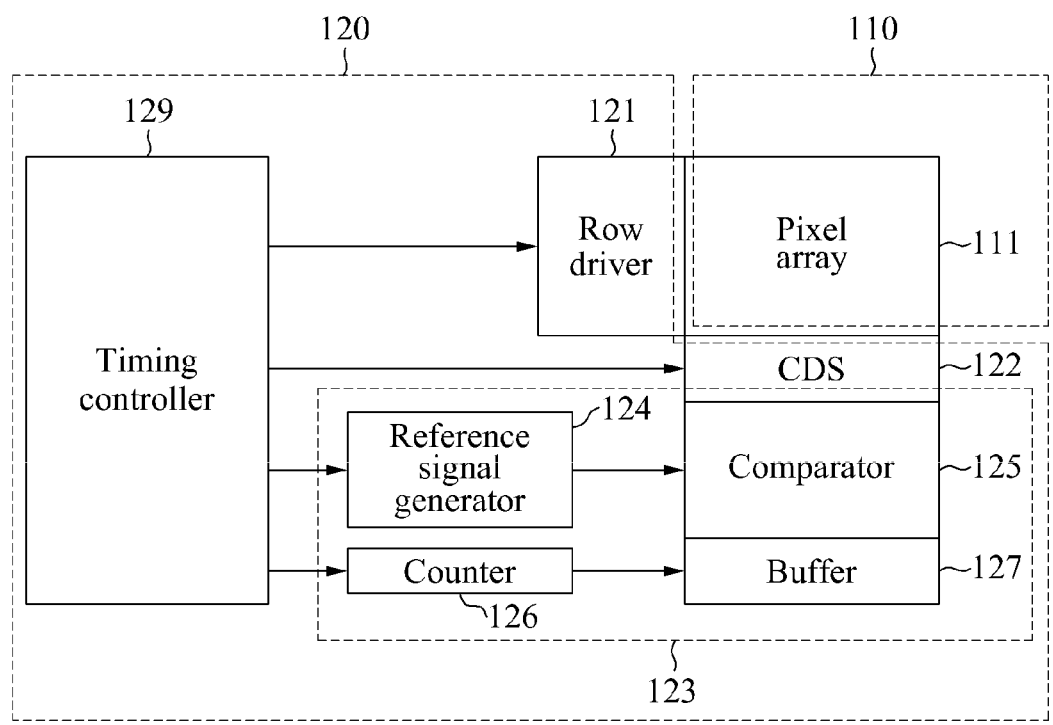
FIG. 1 is a block diagram illustrating an imaging device according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying drawings, however, the present invention is not limited thereto or restricted thereby.

When it is determined a detailed description related to a related known function or configuration that may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

1. A configuration of an imaging device

FIG. 1 is a block diagram illustrating an imaging device 100 according to an embodiment of the present invention.

Referring to FIG. 1, the imaging device 100 may include a photoelectric conversion unit 110 and a control circuit 120.

The photoelectric conversion unit 110 may convert incident light to an electrical signal. The photoelectric conversion unit 110 may include a pixel array 111 in which unit pixels are disposed in a form of a matrix. The unit pixels included in the pixel array 111 will be further described hereinafter. The photoelectric conversion unit 110 may further include an infrared filter and/or a color filter.

The control circuit 120 may include a row driver 121, a correlated double sampling (CDS) unit 122, an analog-to-digital converting (ADC) unit 123, and a timing controller 129.

The row driver 121 may be connected to each row of the pixel array 111 and generate a driving signal to drive each row. For example, the row driver 121 may drive the unit pixels in the pixel array 111 by a row.

The CDS unit 122 may perform CDS by obtaining a difference between a reference voltage indicating a reset state of the unit pixels and an output voltage indicating a signal component corresponding to the incident light using a capacitor, a switch, and the like, and output an analog sampling signal corresponding to an effective signal component. The CDS unit 122 may include a plurality of CDS circuits connected respectively to column lines of the pixel array 111, and output the analog sampling signal corresponding to the effective signal component for each column.

The ADC unit 123 may convert an analog image signal corresponding to the effective signal component to a digital image signal. The ADC unit 123 may include a reference signal generator 124, a comparator 125, a counter 126, and a buffer 127. The reference signal generator 124 may generate a reference signal, for example, a lamp signal having a tilt, and provide the lamp signal to the comparator 125 as a reference signal. The comparator 125 may compare analog sampling signals output by the CDS unit 122 for each column to lamp signals generated by the reference signal generator 124, and output comparative signals having respective transition timings based on an effective signal component. The counter 126 may generate a counting signal by performing a counting operation and provide the counting signal to the buffer 127. The buffer 127 may include latch circuits connected to each of the column lines, for example, a static random access memory (SRAM), latch counting signals output by the counter 126 for each column in response to a transition of each comparative signal, and output the latched counting signals as image data.

The ADC unit 123 may further include an adder circuit to add the sampling signals output by the CDS unit 122. Also, the buffer 127 may further include a plurality of single line buffers.

The timing controller 129 may control an operating timing of the row driver 121, the CDS unit 122, and the ADC unit 123. The timing controller 129 may provide a timing signal and a control signal to the row driver 121, the CDS unit 122, and the ADC unit 123.

Figure 2:
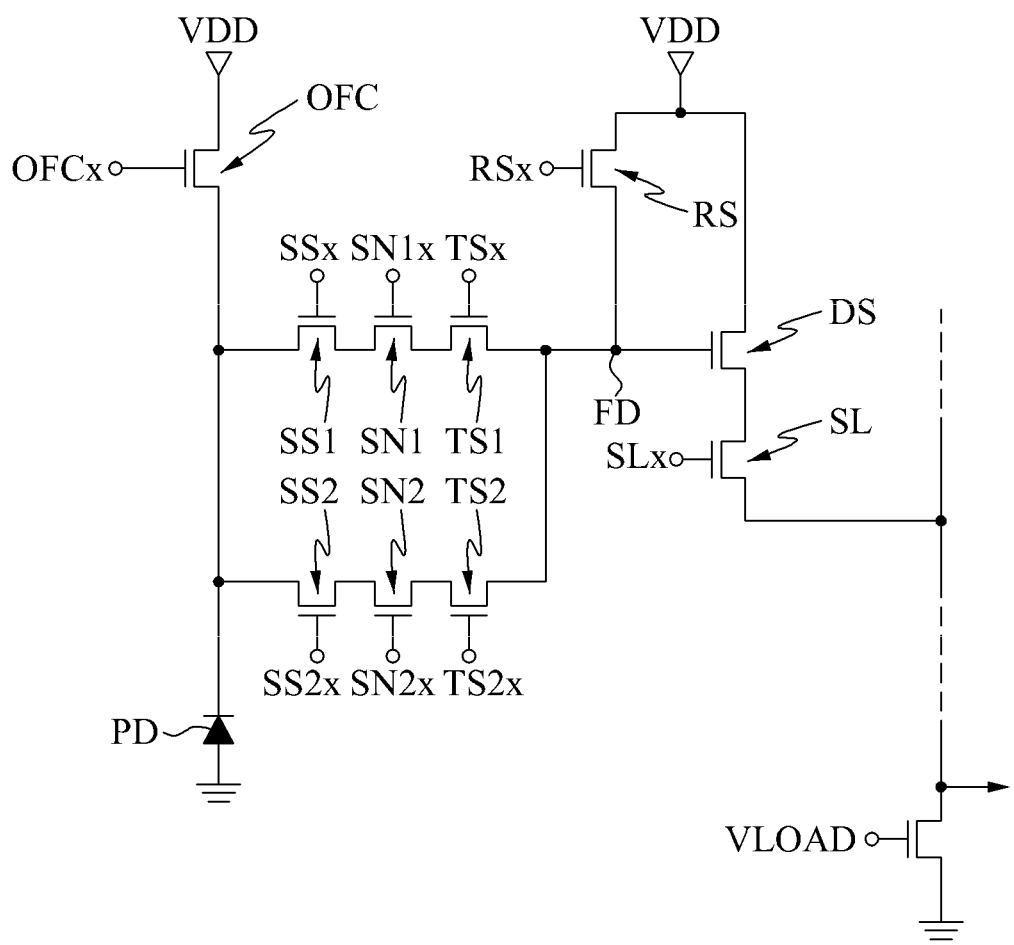
FIG. 2 is a diagram illustrating a circuit of a unit pixel of an imaging device according to an embodiment of the present invention.

FIG. 2 is a diagram illustrating a circuit of a unit pixel of the imaging device 100 according to an embodiment of the present invention.

Referring to FIG. 2, the pixel of the imaging device 100 may include a photoelectric converter which is referred to as a photodiode (PD) herein, an overflow control (OFC) unit, a first shift switching (SS1) unit and a second shift switching (SS2) unit, a first storage node (SN1) and a second storage node (SN2), a first transfer switching (TS1) unit and a second transfer switching (TS2) unit, a reset switching (RS) unit, a drive switching (DS) unit, and a selection switching (SL) unit.

The PD may perform photoelectric conversion. The PD may generate electrical charges by converting incident light during a light integration mode. The PD may be provided in a form of one or a combination of a photodiode, a phototransistor, a photogate, and a pinned photodiode (PPD). The PD may include a first terminal and a second terminal.

The OFC unit may be disposed at one side of the PD. The OFC unit may be disposed at the first terminal of the PD. The OFC unit may be connected to the first terminal of the PD.

Each of the SS1 and the SS2 units may be disposed at a different side of the PD. Each of the SS1 and the SS2 units may be disposed at the second terminal of the PD. Each of the SS1 and the SS2 units may be connected to the second terminal of the PD. Here, the SS1 unit and the SS2 unit may be connected in parallel to each other.

A terminal of each of the SS1 and the SS2 units may be connected to the PD. Each of the SS1 and the SS2 units may include a gate to which a first shift signal (SS1$x$) and a second shift signal (SS2$x$) are applied, respectively.

When the SS1$x$ is applied to the gate of the SS1 unit, charges integrated in the PD may be shifted to the SN1. When the SS2$x$ is applied to the gate of the SS2 unit, the charges integrated in the PD may be shifted to the SN2.

The SN1 may be disposed at one side of the SS1 unit. The SN1 may include a gate to which a first storage signal (SN1$x$) is applied.

The SN2 may be disposed at one side of the SS2 unit. The SN2 may include a gate to which a second storage signal (SN2$x$) is applied.

The TS1 unit may be disposed at one side of the SN1. A terminal of the TS1 unit may be connected to a floating diffusion (FD) node. The TS1 unit may include a gate to which a first transfer signal (TS1$x$) is applied. When the TS1$x$ is applied to the gate of the TS1 unit, charges stored in the SN1 may be transferred to the FD node. Here, the SN1$x$ applied to the gate of the SN1 may be eliminated so that the charges stored in the SN1 may be desirably transferred to the FD node.

The TS2 unit may be disposed at one side of the SN2. A terminal of the TS2 unit may be connected to the FD node. The TS2 node may include a gate to which a second transfer signal (TS2$x$) is applied. When the TS2$x$ is applied to the gate of the TS2 unit, charges stored in the SN2 may be transferred to the FD node. Here, the SN2$x$ applied to the gate of the SN2 may be eliminated so that the charges stored in the SN2 may be transferred to the FD node.

The FD node may receive charges store in the SN1 and/or the SN2 and integrate the charges therein. When the SN1$x$ is eliminated from the gate of the SN1 and the TS1$x$ is applied to the gate of the TS1 unit, the FD node may integrate therein the charges to be transferred from the SN1. When the SN2$x$ is eliminated from the gate of the SN2 and the TS2$x$ is applied to the gate of the TS2 unit, the FD node may integrate therein the charges to be transferred from the SN2.

When the SS1 unit, the SN1, and the TS1 unit are classified as a first storage unit, and the SS2 unit, the SN2, and the TS2 unit are classified as a second storage unit, the first storage unit and the second storage unit may be connected in parallel to each other between the PD and the FD node.

The RS unit may include a first terminal to which a power supply voltage (VDD) is applied, a second terminal connected to the FD node, and a gate to which a reset signal (RS$x$) is applied.

The DS unit may include a first terminal to which a VDD is applied, a gate connected to the FD node, and a second terminal.

The SL unit may include a first terminal connected to the second terminal of the DS unit, a gate to which a selection signal (SL$x$) is applied, and a second terminal proving an output signal.

A detailed description of a method of driving the imaging device 100 will be provided with reference to the related figures.

2. A method of driving an imaging device.

According to an embodiment of the present invention, both a wide dynamic range (WDR) and a global shutter may be achieved by reading an amount of charges integrated during a first integration time (T1) and shifted to the SN1 and reading an amount of charges integrated during a second integration time (T2) and shifted to the SN2.

To achieve the WDR, the control circuit 120 may set the T1 and the T2 to differ. Here, the T1 and the T2 may have a following relationship.

$$1/5000 \leq T1/T2 \leq 1/5$$

Although the T1 and the T2 may have a constant value, the value may depend on feedback received in real time or periodically based on a result of analyzing at least one already obtained image.

For example, when a luminance is determined to be very low as the result of analyzing the at least one already obtained image, or the luminance is less than or equal to a predetermined first luminance threshold, the T1 may be longer than the T1 used to obtain a previous image.

Conversely, when the luminance is determined to be high as the result of analyzing the at least one already obtained image, or the luminance is greater than or equal to a predetermined second luminance threshold, the T2 may be shorter than the T2 used to obtain a previous image.

Although the T1 and the T2 may be identically applied to all effective pixels included in the pixel array 111, the T1 and the T2 may be differently set for effective pixels. For example, a luminance distribution of each effective pixel may be verified, and the T1 and the T2 to be applied to each pixel may be differently set based on the luminance distribution of each effective pixel.

Figure 3:
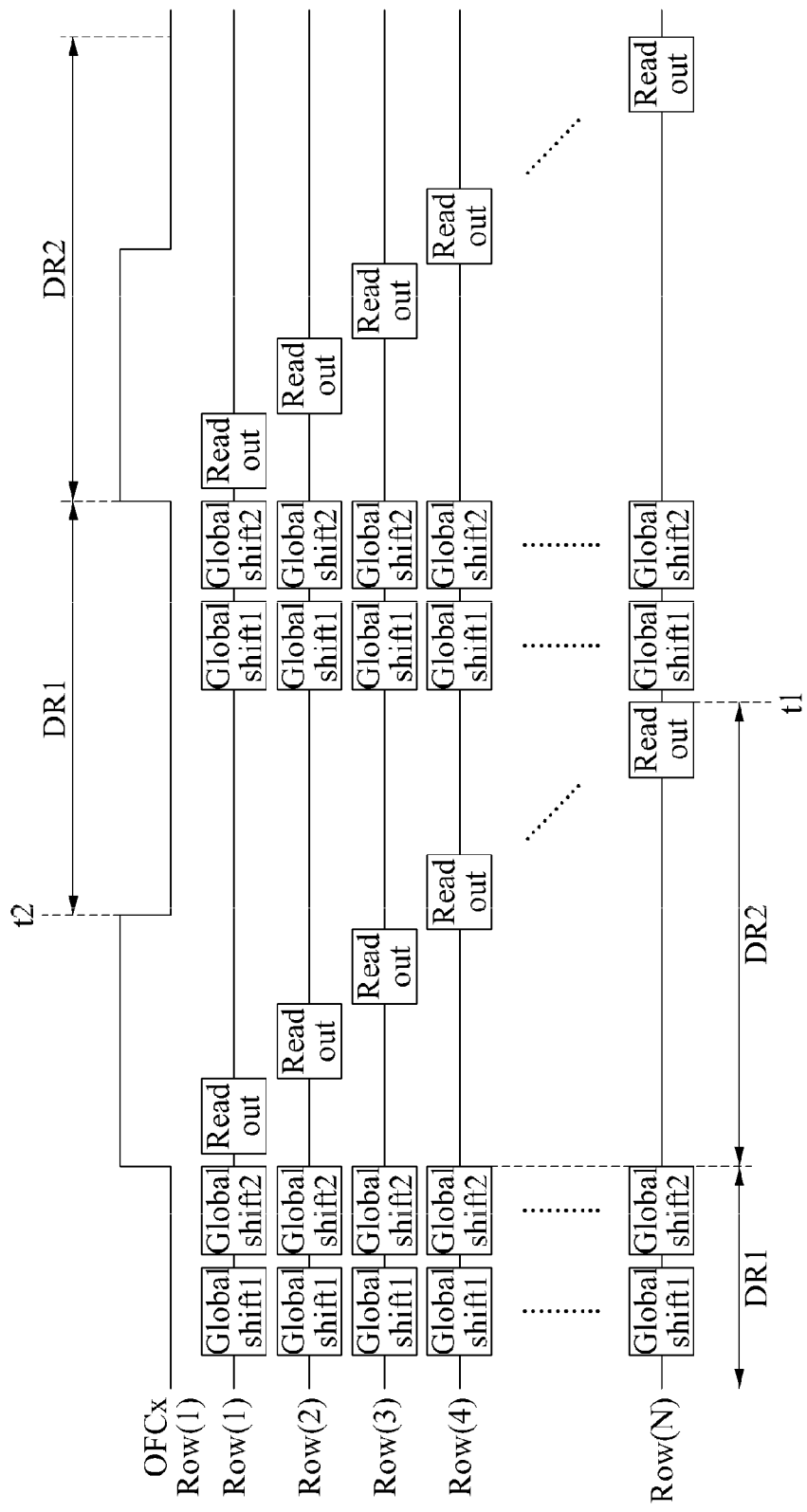
FIG. 3 is a timing diagram illustrating a method of driving a pixel array of an imaging device according to an embodiment of the present invention.
Figure 4:
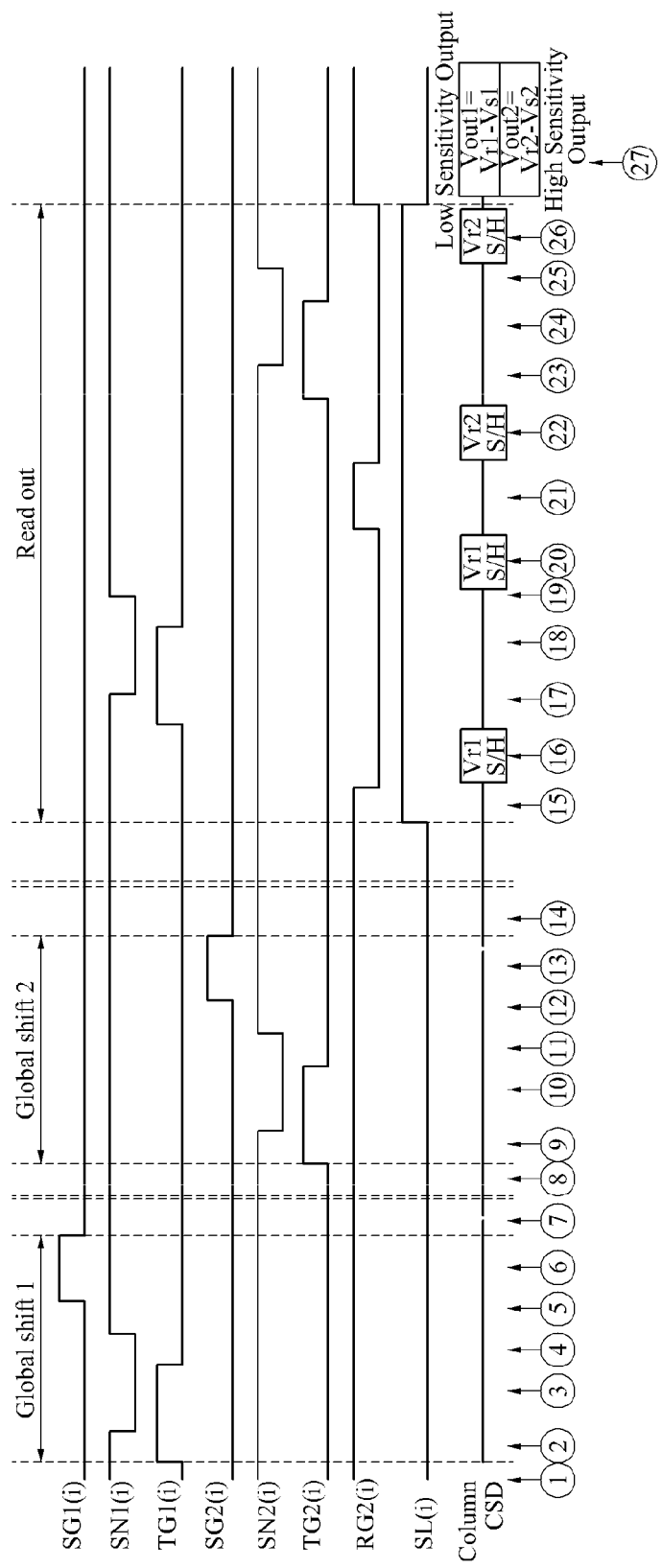
FIG. 4 is a timing diagram of control signals to be applied to respective components of a unit pixel of an imaging device according to an embodiment of the present invention.
Figure 5:
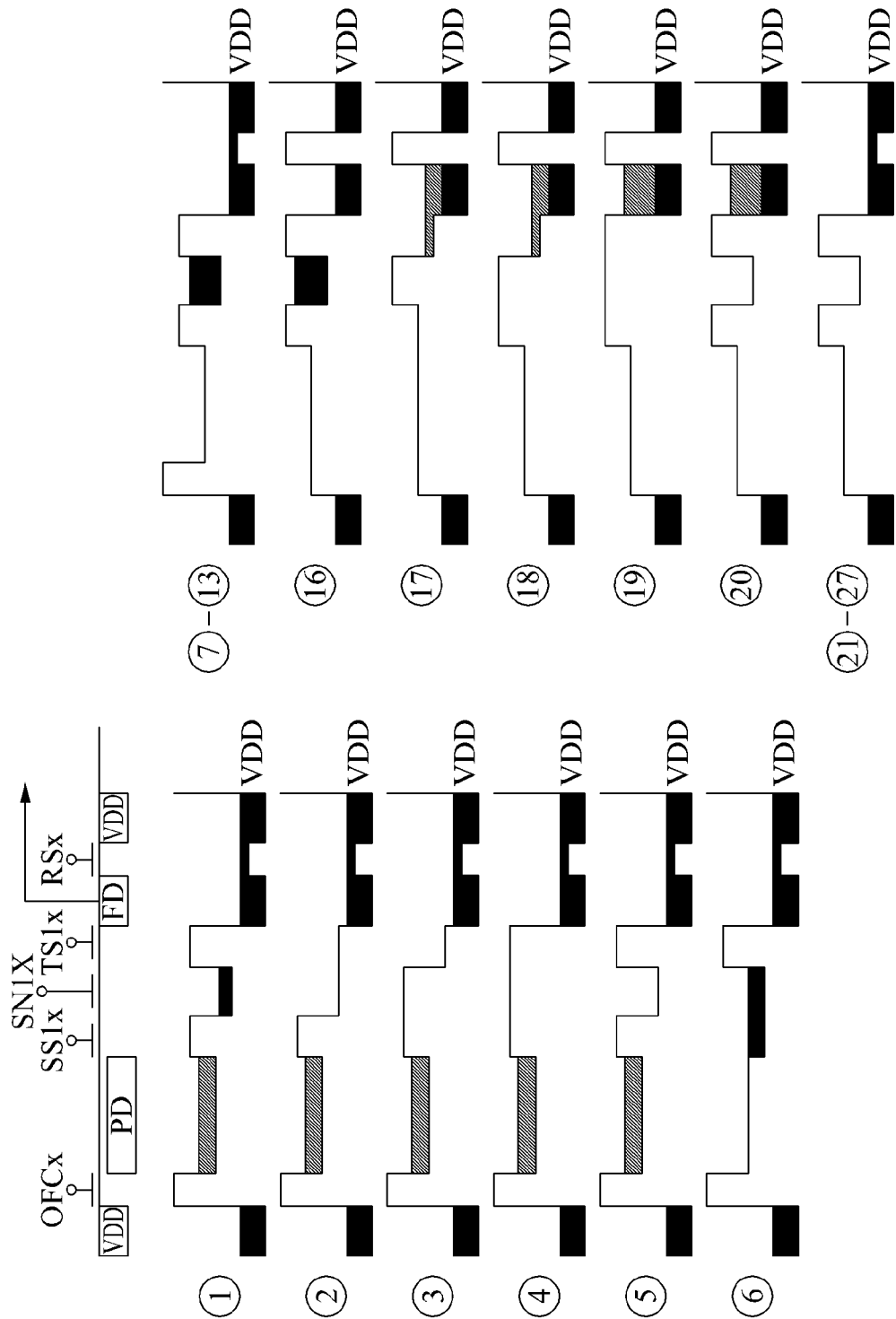
FIGS. 5 and 6 are diagrams illustrating a potential barrier to describe charge transfer in a unit pixel of an imaging device according to an embodiment of the present invention.
Figure 6:
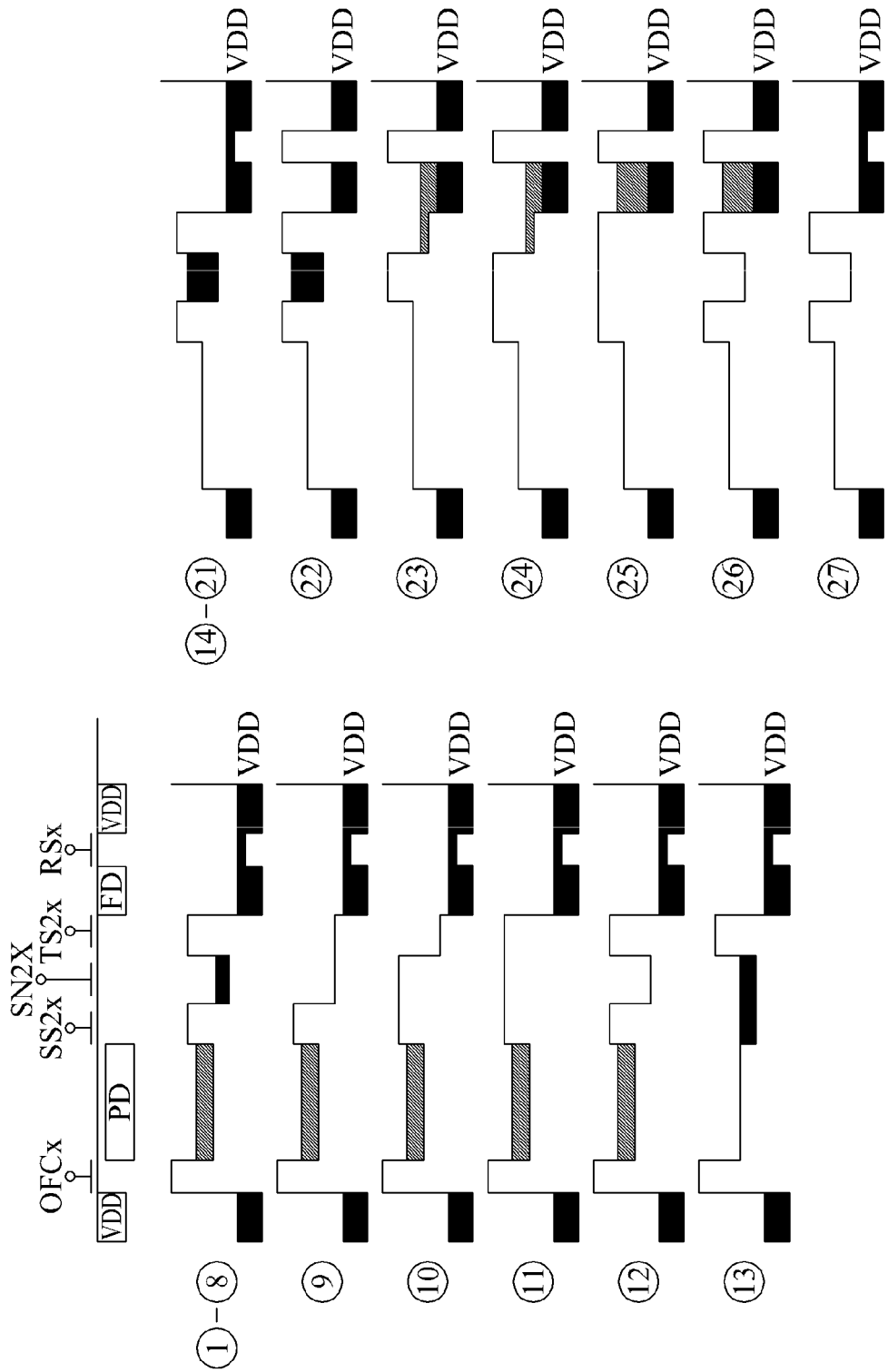

FIG. 3 is a timing diagram illustrating a method of driving the pixel array 111 of the imaging device 100 according to an embodiment of the present invention. FIG. 4 is a timing diagram of control signals to be applied to respective components of a unit pixel of the imaging device 100 according to an embodiment of the present invention. FIGS. 5 and 6 are diagrams illustrating a potential barrier to describe charge transfer in a unit pixel of the imaging device 100 according to an embodiment of the present invention. FIG. 5 illustrates respective potential barriers of the PD, the SS1 unit, the SN1, the TS1 unit, the FD node, and the RS unit in association with respective intervals illustrated in FIG. 4. FIG. 6 illustrates respective potential barriers of the PD, the SS2 unit, the SN2, the TS2 unit, the FD node, and the RS unit in association with respective intervals illustrated in FIG. 4.

Referring to FIG. 3, to obtain an image using the imaging device 100, the pixel array 111 may perform an integrating operation and a shifting operation in a first duration (DR1) and a reading operation in a second interval (DR2).

The pixel array 111 may repeatedly perform the integrating and the shifting operations and the reading operation in order. Subsequent to completion of one set of the operations, an image may be obtained.

The integrating operation may include converting an incident light to an electrical charge by the PD. The integrating operation may be simultaneously performed on all effective pixels included in the pixel array 111.

The shifting operation may include a first shifting operation to shift charges integrated in the PD due to the incident light to the SN1 and a second shifting operation to shift charges integrated in the PD to the SN2. Also, the first and the second shifting operations may include a cleaning operation to eliminate charges that may already be integrated in the SN1 and the SN2, for example, unnecessarily integrated charges. The cleaning operation will be further described hereinafter.

As illustrated in FIG. 3, each of the first and the second shifting operations may be simultaneously performed on all effective pixels included in the pixel array 111. However, a timing at which the first shifting operation is performed may differ from a timing at which the second shifting operation is performed.

Here, an interval between the timings at which the first and the second shifting operations are performed may be determined based on the T2 used for integration of charges to be read by the second reading operation. For example, the T2 may be determined based on an interval between a timing at which the first shifting operation is completed, for example, in interval 6 illustrated in FIGS. 4 and 5 and a timing at which the second shifting operation is completed, for example, in interval 13 illustrated in FIGS. 4 and 6. Thus, the T2 may be adjusted by adjusting the timings including the timing at which the second shifting operation is completed.

While the integrating operation and the shifting operation are performed, the OFC unit may not allow the charges integrated in the PD to be transferred to the OFC unit. To this end, the OFC unit may maintain a high potential barrier. The potential barrier of the OFC unit may be maintained to be higher than potential barriers of the SS1 unit and the SS2 unit. For example, when the OFC unit is provided in a form of a transistor, an OFCx may not be applied to the gate of the OFC unit.

The reading operation may include a first reading operation to read charges shifted to the SN1 from the PD and integrated in the SN1 and a second reading operation to read charges shifted to the SN2 from the PD and integrated in the SN2.

The reading operations may be simultaneously performed on all effective pixels included in the pixel array 111. Alternatively, a method of sequentially reading all the effective pixels by a line may be adopted in lieu of the simultaneous performance of the reading operations. For example, the reading operations may be simultaneously performed on pixels disposed in an identical row as illustrated in FIG. 3 and the reading operations may be performed on pixels disposed in a different row at a different timing.

An order of the first reading operation to read an amount of the charges integrated in the SN1 and the second reading operation to read an amount of the charges integrated in the SN2 may not be predetermined. For example, FIGS. 4 and 5 illustrate an example in which the first reading operation to read the amount of the charges integrated in the SN1 is performed prior to the second reading operation to read the amount of the charges integrated in the SN2. However, the second reading operation may be performed prior to the first reading operation.

To read the amount of the charges stored in the SN1 and the SN2, the charges stored in the SN1 and the SN2 may be transferred to the FD node and thus, the amount of the charges may be read.

As described in the foregoing, an image may be obtained subsequent to completion of a first cycle including the integrating operation, the shifting operation, and the reading operation. Also, another image may be obtained subsequent to completion of a second cycle including the integrating operation, the shifting operation, and the reading operation. Here, the second cycle may be performed subsequent to completion of the first cycle. However, a portion of the first cycle may overlap with a portion of the second cycle. For example, as illustrated in FIG. 3, a first point in time (t1) at which the first cycle is terminated may follow a second point in time (t2) at which the second cycle is started.

The integrating operation, the shifting operation, and the reading operation on each unit pixel will be further described with reference to FIGS. 4 through 6.

Referring to FIGS. 4 through 6, intervals 1 through 14 may correspond to the integrating and the shifting operations, and intervals 15 through 27 may correspond to the reading operation.

As illustrated in FIG. 6, in interval 1, the OFC unit and the SS1 and the SS2 units may be controlled to maintain potential barriers formed by the OFC unit and the SS1 and the SS2 units to be high. The potential barriers formed by the OFC unit and the SS1 and the SS2 units may be maintained to be higher than a potential barrier of the PD. For example, an OFCx, an SS1x, and an SS2x may not be applied to respective gates of the OFC unit and the SS1 and the SS2 units. As illustrated in FIGS. 4 through 6, an SN1x, an SN2x, and an RSx may be applied to respective gates of the SN1, the SN2, and the RS unit. Also, a TS1x and TS2x may not be applied to respective gates of the TS1 and the TS2 units. However, control signals to be applied to the SN1, the SN2, the TS1 and the TS2 units, and the RS unit, and the potential barriers to be formed by the foregoing components during interval 1 may not need to be controlled as illustrated in FIGS. 4 and 6. For ease of description, an example in which the control signals are applied as illustrated in FIGS. 4 through 6 is provided herein.

Intervals 2 through 5 may correspond to the cleaning operation. The intervals may correspond to the cleaning operation performed on the SN1. The intervals may required for eliminating charges unnecessarily integrated in the SN1 to read a value of charges integrated in the PD more precisely.

The cleaning operation may be performed to read only an amount of charges formed by incident light, more precisely. Thus, performing the cleaning operation immediately before the shifting operation may be preferable. As described in the foregoing, a timing at which the first shifting operation to shift the charges integrated in the PD to the SN1 is performed may differ from a timing at which the second shifting operation to shift the charges integrated in the PD to the SN2 is performed. Thus, the cleaning operation may be performed on the SN1 and the SN2 at different timings. As illustrated in FIGS. 4 through 6, the cleaning operation on the SN2 may be performed during intervals 9 through 12, while the cleaning operation on the SN1 may be performed during intervals 2 through 5.

To perform the cleaning operation on the SN1, during interval 2, the TS1 unit may be controlled to change the potential barrier formed by the TS1 unit to be low, while a state of the SS1 unit is not changed. For example, the TS1$x$ may be applied to the gate of the TS1 unit. Here, the potential barrier of the TS1 unit may be controlled to be less than or equal to the potential barrier of the SN1. Accordingly, the charges unnecessarily integrated in the SN1 may be transferred to the TS1 unit. Here, the FD node may be maintained in a reset state and thus, the charges transferred to the TS1 unit may all be reset. Accordingly, the charges unnecessarily integrated in the SN1 may be eliminated. To more precisely eliminate the charges unnecessarily integrated in the SN1, operations of intervals 3 and 4 may be further performed. The potential barriers of the SN1 and the TS1 unit may be sequentially changed to be high. For example, the control signals, for example, the SN1$x$ and the TS1$x$ applied to the respective gates of the SN1 and the TS1 unit may be eliminated. Accordingly, the charges unnecessarily integrated in the SN1 may be transferred to the FD node maintaining the reset state more firmly and thus, eliminated. During interval 5, each of the SN1 and the TS1 unit may be controlled to maintain the potential barriers of the SS1 unit and the TS1 unit to be higher than the potential barrier of the SN1. Accordingly, the SN1 may be prepared for receiving charges integrated in the PD.

As described in the foregoing, when the cleaning operation is completed, an operation of interval 6 may be performed to shift the charges integrated in the PD to the SN1. To this end, the SS1 unit may be controlled to allow the potential barrier of the SS1 unit to be lower than the potential barrier of the PD. For example, the SS1$x$ may be applied to the SS1 unit.

After the charges integrated in the PD are shifted to the SN1, during interval 7, the SS1 unit may be controlled to change the potential barrier of the SS1 unit to be high and thus, prevent the charges shifted to the SN1 from flowing backwards to the PD. For example, the SS1$x$ applied to the SS1 unit may be eliminated.

Thus, the first shifting operation on the SN1 may be completed. When the first shifting operation is completed, charges may be reintegrated in the PD due to incident light. The imaging device 100 may maintain a state of interval 8 for a predetermined period of time based on the T2.

Subsequently, an operation of intervals 9 through 13 may be performed to shift the charges integrated in the PD to the SN1.

During intervals 9 through 12 corresponding to the foregoing intervals 2 through 5, the cleaning operation may be performed to eliminate charges unnecessarily integrated in the SN2.

To perform the cleaning operation on the SN2, during interval 9, the TS2 unit may be controlled to change the potential barrier formed by the TS2 unit to be low, while a state of the SS2 is not changed. For example, the TS2$x$ may be applied to the gate of the TS2 unit. Here, the potential barrier of the TS2 unit may be controlled to be less than or equal to the potential barrier of the SN2. Accordingly, the charges unnecessarily integrated in the SN2 may be transferred to the TS2 unit. Here, the FD node may be maintained in the reset state and thus, the charges transferred to the TS2 unit may all be reset. Accordingly, the charges unnecessarily integrated in the SN2 may be eliminated. To more precisely eliminate the charges unnecessarily integrated in the SN2, operations of intervals 10 and 11 may be further performed. The potential barriers of the SN2 and the TS2 unit may be sequentially changed to be high. For example, the control signals, for example, the SN2$x$ and the TS2$x$ applied to the respective gates of the SN2 and the TS2 unit may be eliminated. Accordingly, the charges unnecessarily integrated in the SN2 may be transferred to the FD node maintaining the reset state more firmly and thus, eliminated. During interval 12, each of the SN2 and the TS2 unit may be controlled to maintain the potential barriers of the SS2 unit and the TS2 unit to be higher than the potential barrier of the SN2. Accordingly, the SN2 may be prepared for receiving charges integrated in the PD.

As described in the foregoing, when the cleaning operation is completed on the SN2, an operation of interval 13 may be performed to shift charges integrated in the PD during the T2 to the SN2. To this end, the SS2 unit may be controlled to allow the potential barrier of the SS2 unit to be lower than the potential barrier of the PD. For example, the SS2$x$ may be applied to the gate of the SS2 unit.

After the charges integrated in the PD are shifted to the SN2, in interval 14, the SS2 unit may be controlled to change the potential barrier of the SS2 unit to be high and thus, prevent the charges shifted to the SN2 from flowing backwards to the PD. For example, the SS2$x$ applied to the SS2 may be eliminated.

Thus, the second shifting operation may be completed on the SN2. The first and the second shifting operations may all be completed and accordingly, the first and the second shifting operations may be completed on all effective pixels included in the pixel array 111.

When the shifting operation is completed, each unit pixel may maintain a state of interval 14 until the reading operation is started on the unit pixel. In interval 14, the OFC unit may be controlled to prevent charges integrated in the PD by light continuously incident to the PD from overflowing into the SN1 and the SN2. The OFC unit may be controlled to allow the potential barrier of the OFC unit to be lower than the potential barriers of the SS1 and the SS2 and thus, the charges integrated in the PD may overflow into the OFC unit. However, the PD may need to perform a reintegration operation to obtain a subsequent image and charges unnecessarily integrated in the PD may need to be eliminated. Thus, the OFC unit may be controlled to allow the potential barrier of the OFC unit to be less than or equal to the potential barrier of the PD. The potential barrier of the OFC unit may be maintained to be low immediately before the integrating operation in a next cycle is performed. Although FIGS. 5 and 6 illustrate an example in which the potential barrier of the OFC unit is maintained to be low while the reading operation is performed based on an assumption that operations in a first cycle and in a second cycle do not overlap, the imaging device 100 and the method of driving the imaging device 100 may not be limited to the example illustrated in FIGS. 5 and 6. For example, as illustrated in FIG. 3, the reading operation included in the first cycle and the integrating operation included in the second cycle may overlap. When the integrating operation in a next cycle is performed while the reading operation is not completed, the OFC unit may be controlled to change the potential barrier of the OFC unit to be high again and thus, charges may start being integrated in the PD. The potential barrier of the OFC unit may be changed to be high again during an interval among intervals 16 through 26 illustrated in FIGS. 5 and 6. A timing at which the potential barrier of the OFC unit is changed to be high again may be determined based on the T1.

The reading operation will be further described with reference to FIGS. 4 through 6.

The imaging device 100 may maintain a state of interval 14 and perform the reading operation when a timing of the reading operation arrives. The reading operation on each pixel may be sequentially performed line by line.

The reading operation may include a first reading operation to read an amount of charges integrated in the SN1 and a second reading operation to read an amount of charges integrated in the SN2. Although the first reading operation and the second reading operation may be performed in a random order, an example in which the first reading operation is performed prior to the second reading operation is described herein.

In interval 16, the RS unit may be controlled to change the potential barrier of the RS unit to be high. Subsequently, a first output signal may be generated by sampling an electrical potential of the FD node.

In interval 16, the SL unit may be changed to be an on state. For example, an SLx may be applied to the gate of the SL unit. The on state of the SL unit changed in interval 10 may be maintained until interval 26.

During intervals 17 through 19, the charges integrated in the SN1 may be transferred to the FD node. To this end, in interval 17, the potential barrier of the TS1 unit may be changed to be low and thus, the charges integrated in the SN1 may be transferred to the FD node. For example, a TS1x may be applied to the gate of the TS1 unit. Here, to ensure a more precise transfer of the charges integrated in the SN1 to the FD node, operations of intervals 18 and 19 may be further performed. Thus, the potential barriers of the SN1 and the TS1 unit may be sequentially changed to be high. For example, respective control signals, for example, the SN1x and the TS1x, applied to the SN1 and the TS1 unit, may be eliminated. Accordingly, the charges integrated in the SN1 may be transferred to the FD node more precisely. Here, the potential barrier of the RS unit may be maintained to be high throughout intervals 17 through 19 and the charges integrated in the SN1 may be transferred to the FD node and integrated in the FD node.

In interval 20, a second output signal may be generated by sampling an electrical potential of the FD node. Here, an amount of the charges integrated in the SN1 may be determined based on a difference between the first output signal and the second output signal. In interval 21, the RS unit may be controlled to reset the FD node.

As described in the foregoing, the first reading operation to read the amount of the charges integrated in the SN1 may be completed. Subsequently, the second reading operation may be performed. The second reading operation may be performed similarly to the first reading operation. The second reading operation will be further described hereinafter.

In interval 22, the RS unit may be controlled to change the potential barrier of the RS unit to be high. Accordingly, a third output signal may be generated by sampling an electrical potential of the FD node.

Throughout intervals 23 and 25, charges integrated in the SN2 may be transferred to the FD node. To this end, in interval 23, the potential barrier of the TS2 unit may be changed to be low and thus, the charges integrated in the SN2 may be transferred to the FD node. For example, a TS2x may be applied to the gate of the TS2 unit. Here, to ensure a more precise transfer of the charges integrated in the SN2 to the FD node, operations of intervals 24 and 25 may be further performed. The potential barriers of the SN2 and the TS2 unit may be sequentially changed to be high. For example, respective control singles, for example, the SN2x and the TS2x applied to the SN2 and the TS2 unit may be eliminated. Thus, the charges integrated in the SN2 may be more precisely transferred to the FD node. Here, the potential barrier of the RS unit may be maintained to be high throughout intervals 23 through 25 and the charges integrated in the SN2 may be transferred to the FD node and integrated in the FD node.

In interval 26, a fourth signal may be generated by sampling an electrical potential of the FD node. Here, the amount of the charges integrated in the SN2 may be determined based on a difference between the third output signal and the fourth output signal. Subsequently, in interval 27, the RS unit may be controlled to rest the FD node.

As described in the foregoing, the second reading operation to read the amount of the charges integrated in the SN2 may be completed.

In interval 27, a state of the SL unit may be changed to be an off state. Thus, the reading operation performed on a single unit pixel or pixels arranged in an identical line may be completed.

Each pixel may repeatedly perform the foregoing operations. An image may be obtained after the operations in a cycle including intervals 1 through 27 are performed. In a case of forming a video by obtaining a plurality of still images, images captured successively may need to be obtained. Here, several cycles of the operations may be repeatedly performed.

As described in the foregoing, the imaging device 100 may performed the first and the second shifting operations, and the first and the second reading operations. Here, T1 used to integrate an amount of charges to be read by the first reading operation in the PD may be longer than T2 used to integrate an amount of charges to be ready by the second reading operation is integrated in the PD. A value of the amount of the charges read by the first reading operation may be used to obtain a low-luminance image and a value of the amount of the charges read by the second reading operation may be used to obtain a high-luminance image. Accordingly, the imaging device 100 and the method of driving the imagine device 100 according to an embodiment of the present invention may obtain a final image based on an image to be obtained by the first reading operation and another image to be obtained by the second reading operation and thus, a WDR may be achieved.

Although the T1 and the T2 may have a constant value, the T1 and the T2 may vary by analyzing at least one already obtained image and receiving feedback in real time or periodically. To change the T1 and T2 in real time or periodically, the imaging device 100 may verify a luminance based on the already obtained image or give feedback on the change of the T1 and the T2 based on the verified luminance.

Although the T1 and the T2 may be identically applied to all effective pixels included in the pixel array 111, the T1 and the T2 may be differently set for each effective pixel. For example, a luminance distribution for each effective pixel may be verified by analyzing the at least one already obtained image and thus, the T1 and the T2 to be applied to each pixel may be differently set based on the luminance distribution for each effective pixel.

As described in the foregoing, an amount of charges integrated in the PD for a relatively long period of time and an amount of charges integrated in the PD for a relatively short period of time may be read and accordingly, a final image having an expanded DR may be obtained based on the reading. Also, the first and the second shifting operations may be simultaneously performed on all effective pixels included in the pixel array 111 and accordingly, an image of a fast moving object may be obtained without image distortion.

According to an embodiment of the present invention, the imaging device 100 and the method of driving the imaging device 100 may enable a WDR and a global shutter with which a moving object may be captured without distortion.

Although an example in which two storage nodes are disposed in parallel between the PD and the FD node is described herein, at least three storage nodes may be connected in parallel between the PD and the FD node based on a modification to the present invention.

When an imaging device according to another embodiment of the present invention includes the at least three storage nodes, periods of time used for integration of charges to be shifted to the at least three storage nodes from the PD may be different from one another. For example, when the imaging device includes a third storage node, a fourth storage node, and a fifth storage node, a third integration time (T3) used for integration of an amount of charges to be shifted to the third storage node and to be read, a fourth integration time (T4) used for integration of an amount of charges to be shifted to the fourth storage node and to be read, and a fifth integration time (T5) used for integration of an amount of charges to be shifted to the fifth storage node and to be read may differ from one another. The integration times may have a following relationship.

$$1/5000 \leq T3/T4 \leq 1/5$$

$$1/5000 \leq T4/T5 \leq 1/5$$

Accordingly, the imaging device may obtain a low-luminance image based on the amount of the integrated charges during the T3, a medium-luminance image based on the amount of the integrated during the T4, and a high-luminance image based on the amount of the integrated charges during the T5. The imaging device may obtain a final image based on the obtained low-luminance image, the medium-luminance image, and the high-luminance image. Accordingly, the imaging device may achieve the WDR. Also, a third shifting operation to shift the charges integrated in the PD to the third storage node, a fourth shifting operation to shift the charges integrated in the PD to the fourth storage node, and a fifth shifting operation to shift the charges integrated in the PD to the fifth storage node may be simultaneously performed on all effective pixels included in the pixel array 111 and thus, a global shutter may be implemented. Thus, the imaging device according to another embodiment of the present invention may achieve both the WDR and the global shutter.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An imaging device, comprising:
a plurality of pixels; and
a control circuit to apply a signal to the pixels,
wherein the pixels comprise:
a photodiode;
a floating diffusion node;
a first storage node and a second storage node to be connected in parallel to each other between the photodiode and the floating diffusion node;
a first shift switching unit to selectively shift charges integrated in the photodiode to the first storage node;
a second shift switching unit to selectively shift the charges integrated in the photodiode to the second storage node;
a first transfer switching unit to selectively transfer charges integrated in the first storage node to the floating diffusion node;
a second transfer switching unit to selectively transfer charges integrated in the second storage node to the floating diffusion node; and
a reset switching unit to be disposed at one side of the floating diffusion node,
wherein the control circuit applies the signal to shift charges of the photodiode of each of the plurality of pixels simultaneously to the first storage node or the second storage node from the photodiode.

2. The imaging device of claim 1, wherein the pixels comprise:
an overflow control unit to be connected to the photodiode.

3. The imaging device of claim 1, wherein the control circuit controls the first shift switching unit and the second shift switching unit to differentiate a first timing at which the control circuit controls the first shift switching unit to shift the charges integrated in the photodiode to the first storage node from a second timing at which the control circuit controls the second shift switching unit to shift the charges integrated in the photodiode to the second storage node.

4. The imaging device of claim 1, wherein the control circuit performs a first reading operation to read an amount of the charges integrated in the first storage node through the floating diffusion node and a second reading operation to read an amount of the charges integrated in the second storage node through the floating diffusion node.

5. The imaging device of claim 1, wherein the charges shifted to the first storage node from the photodiode are not transferred to the second storage node, and
wherein the charges shifted to the second storage node from the photodiode are not transferred to the first storage node.

6. The imaging device of claim 1, wherein a first integration time used for integration of the charges to be shifted to the first storage node differs from a second integration time used for integration of the charges to be shifted to the second storage node.

7. The imaging device of claim 1, wherein the pixels further comprise:
a third storage node to be connected between the photodiode and the floating diffusion node;
a third shift switching unit to selectively shift charges integrated in the photodiode to the third storage node; and
a third transfer switching unit to selectively transfer charges integrated in the third storage node to the floating diffusion node,
wherein the third storage node is connected in parallel to the first storage node and the second storage node.

8. The imaging device of claim 7, wherein a first timing at which the charges integrated in the photodiode is shifted to the first storage node, a second timing at which the charges integrated in the photodiode is shifted to the second storage node, and a third timing at which the charges integrated in the photodiode is shifted to the third storage node are different from one another.

9. The imaging device of claim 7, wherein the charges shifted to the first storage node from the photodiode are not transferred to the second storage node and the third storage node,
    wherein the charges shifted to the second storage node form the photodiode are not transferred to the first storage node and the third storage node, and
    wherein the charges shifted to the third storage node from the photodiode are not transferred to the first storage node and the second storage node.

10. The imaging device of claim 7, wherein a first integration time used for integration of the charges to be shifted to the first storage node, a second integration time used for integration of the charges to be shifted to the second storage node, and a third integration time used for integration of the charges to be shifted to the third storage node are different from one another.

11. An imaging device, comprising:
    a plurality of pixels; and
    a control circuit to apply a signal to the pixels, and
    wherein the pixels comprise:
    a photodiode;
    a floating diffusion node; and
    a first storage node and a second storage node to be connected in parallel to each other between the photodiode and the floating diffusion node, and
    wherein the control circuit sets a first integration time used to integrate charges to be shifted to the first storage node from the photodiode and a second integration time used to integrate charges to be transferred to the second storage node from the photodiode to be different from each other, and
    wherein the control circuit applies the signal to shift charges of the photodiode of each of the plurality of pixels simultaneously to the first storage node or the second storage node from the photodiode.

12. The imaging device of claim 11, wherein the control circuit performs a first shifting operation to shift the charges integrated in the photodiode comprised in the pixels to the first storage node during the first integration time, and
    wherein the control circuits performs a second shifting operation to shift the charges integrated in the photodiode comprised in the pixels to the second storage node during the second integration time.

13. The imaging device of claim 11, wherein the control circuit simultaneously performs the first shifting operation and the second shifting operation on the pixels.

14. The imaging device of claim 12, wherein the control circuit performs the first shifting operation at a first timing and the second shifting operation at a second timing.

15. The imaging device of claim 14, wherein the control circuit controls the pixels to perform an operation of integrating the charges to be shifted to the second storage node from the photodiode between the first timing and the second timing.

16. The imaging device of claim 11, wherein the control circuit performs a first reading operation to read the charges shifted to the first storage node.

17. The imaging device of claim 16, wherein the control circuit sequentially performs the first reading operation on the pixels.

18. The imaging device of claim 11, wherein the control circuit performs a second reading operation to read the charges shifted to the second storage node.

19. The imaging device of claim 18, wherein the control circuits sequentially performs the second reading operation on the pixels.

20. The imaging device of claim 11, wherein the control circuit performs a reading operation to read an amount of the charges shifted to the first storage node and the second storage node.

21. The imaging device of claim 1, wherein the control circuit sequentially changes potential barriers of the first storage node and the first transfer switching unit to be high, in order to transfer the charges integrated in the first storage node to the floating diffusion node, and
    wherein the control circuit sequentially changes potential barriers of the second storage node and the second transfer switching unit to be high, in order to transfer the charges integrated in the second storage node to the floating diffusion node.

22. The imaging device of claim 11, wherein the control circuit changes potential barrier of the first storage node to be high when transferring the charges integrated in the first storage node to the floating diffusion node, and
    wherein the control circuit changes the potential barrier of the second storage node to be high when transferring the charges integrated in the second storage node to the floating diffusion node.

* * * * *